Figure 1:
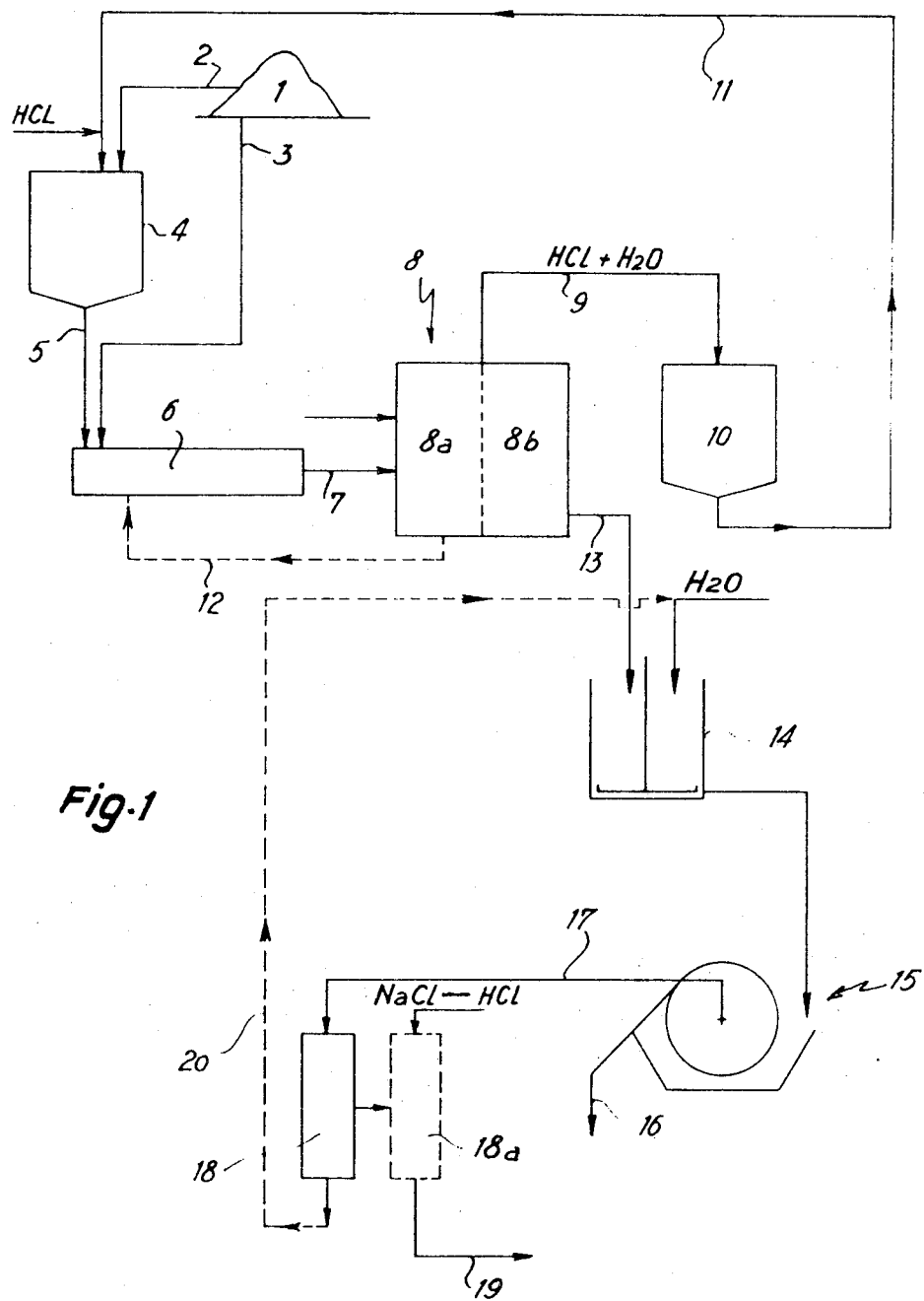

United States Patent

Gandon et al.

[15] 3,661,564
[45] May 9, 1972

[54] EXTRACTION OF COBALT AND NICKEL FROM LATERITE

[72] Inventors: Louis Gandon; Christian Bozec; Philippe Lenoble; Robert Lemarinel, all of Le Havre; Pierre Fer, Caucriauville Le Havre, all of France

[73] Assignee: Le Nickel, Paris, France

[22] Filed: Nov. 16, 1970

[21] Appl. No.: 89,915

[30] Foreign Application Priority Data

Nov. 19, 1969 France..................................6939777
Dec. 19, 1969 France..................................6944050

[52] U.S. Cl.............................75/101 R, 75/82, 75/101 BE, 75/113, 75/114, 75/104, 75/119, 204/113
[51] Int. Cl. .........................................................C22b 23/04
[58] Field of Search................75/119, 113, 101 BE, 82, 114, 75/104, 101 R

[56] References Cited

UNITED STATES PATENTS

| | | | |
|---|---|---|---|
| 603,797 | 5/1898 | Storer | 75/104 |
| 981,451 | 1/1911 | McKechnie et al. | 75/101 R |
| 1,943,332 | 1/1934 | Mitchell | 75/104 X |
| 2,045,092 | 6/1936 | Mitchell | 75/113 |
| 2,766,115 | 10/1956 | Graham et al. | 75/119 |
| 3,235,377 | 2/1966 | Hard et al. | 75/119 |
| 3,532,490 | 10/1970 | Burkin | 75/108 X |

*Primary Examiner*—George T. Ozaki
*Attorney*—Oberlin, Maky, Donnelly & Renner

[57] ABSTRACT

A method for the recovery of nickel and cobalt from laterite with the elimination of iron, wherein the laterite is divided into a major and a minor portion and the minor portion is treated with hydrochloric acid to form a suspension. The major portion of laterite is mixed with the suspension to form a slurry which is roasted to form cobalt and nickel chloride. The nickel and cobalt chlorides are then dissolved by treating the solid residue with water, ferric chloride remaining in the residue. The solution is then subjected to a recovery treatment including cation exchange to separate the cobalt and nickel ions, and reduction to produce cobalt and nickel.

9 Claims, 2 Drawing Figures

EXTRACTION OF COBALT AND NICKEL FROM LATERITE

The present invention relates to the extraction of metallic valuables contained in lateritic minerals or similar compounds, and in particular to the extraction of their nickel and cobalt content, which constitute the most interesting metals. These metallic valuables may be recovered in the form of metals or in the form of salts.

By lateritic minerals, there are understood oxidized minerals containing a low proportion by weight of nickel and cobalt, generally less than 2 percent and a very high proportion of iron, which may be as high as 50 percent, the other metals present being mainly aluminum, manganese and magnesium. A typical example of these minerals is the nickel mineral extracted from the various deposits in New Caledonia. Naturally, the means and methods of the invention which will be described hereafter regarding the minerals, may be applied to synthesized products having a similar composition (by-products and industrial residues), without diverging from the present invention.

Various methods are known which make possible the recovery of nickel and cobalt from laterites. Two methods are currently used which make use respectively of a sulphuric acid lixiviation under pressure and sulphatizing roasting. There has also been proposed an attack of the mineral by hydrogen chloride gas in the presence of water/vapor.

The various known methods will not be discussed fully since the present invention is not derived from them and does not depend upon them. However, it may be pointed out that all the known techniques have, to some degree, the following disadvantages:

a relatively low extraction yield - far from the theoretical yield;

contamination by iron of the nickel and cobalt finally recovered;

the necessity of using very considerable quantities of reagents (sulphuric acid or hydrogen chloride gas);

a low concentration of the nickel and cobalt solutions finally obtained.

The essential object of the invention is to provide a method for the recovery of metallic values contained in the laterites, not having the aforesaid disadvantages.

According to the present invention, the laterite is divided into a minor fraction and a major fraction, the minor fraction is treated with hydrochloric acid in order to create a suspension in which the iron of the laterite is transformed into ferric chloride, the major fraction of the laterite is mixed with this suspension in order to form a homogenous slurry, this slurry is subjected to a high temperature treatment in the course of which nickel and cobalt chlorides are formed, with liberation of hydrogen chloride gas, this hydrogen chloride gas is recycled so that it participates in the treatment of the minor fraction of the laterite, the solid residue is leached with water after roasting, which causes the nickel and cobalt chlorides to pass into a primary solution, all the iron remaining in the residue, and the said primary solution is subjected to a treatment to recover the metallic valuables which it contains.

It can be seen that the invention thus proposes a method of recovering metallic valuables, the major advantage of which is the separation of iron (which does not pass into solution) and of other metals (which are passed into the primary aqueous solution).

In a first embodiment of the method according to the invention, the aforesaid high temperature treatment is essentially a roasting preceded by a drying.

In a second embodiment, this treatment takes place in an autoclave.

Generally, the primary solution containing the metallic valuables may be treated in various ways for the recovery of the said valuables.

Advantageously, and according to another feature of the invention, the primary solution is passed over a bed of cationic resin which retains the metallic valuables which are then easily recovered.

As a variation, and according to another feature of the invention, the said primary solution is contacted with an organic, cationic exchanger comprising at least one tertiary carboxylic acid having from nine to 11 carbon atoms per molecule, ammonia is introduced simultaneously into the solution in order to bring its pH to a value for which the cobalt passes into the organic phase in the form of the carboxylic acid salt whereas the nickel remains in the aqueous phase in the form of a divalent amine complex, the organic phase is separated from the aqueous phase and the two phases are treated separately in order to recover respectively the cobalt and the nickel.

Naturally, it is only a question of preferential treatments of the primary solution which may also be treated by any known, standard methods.

Figure 2:
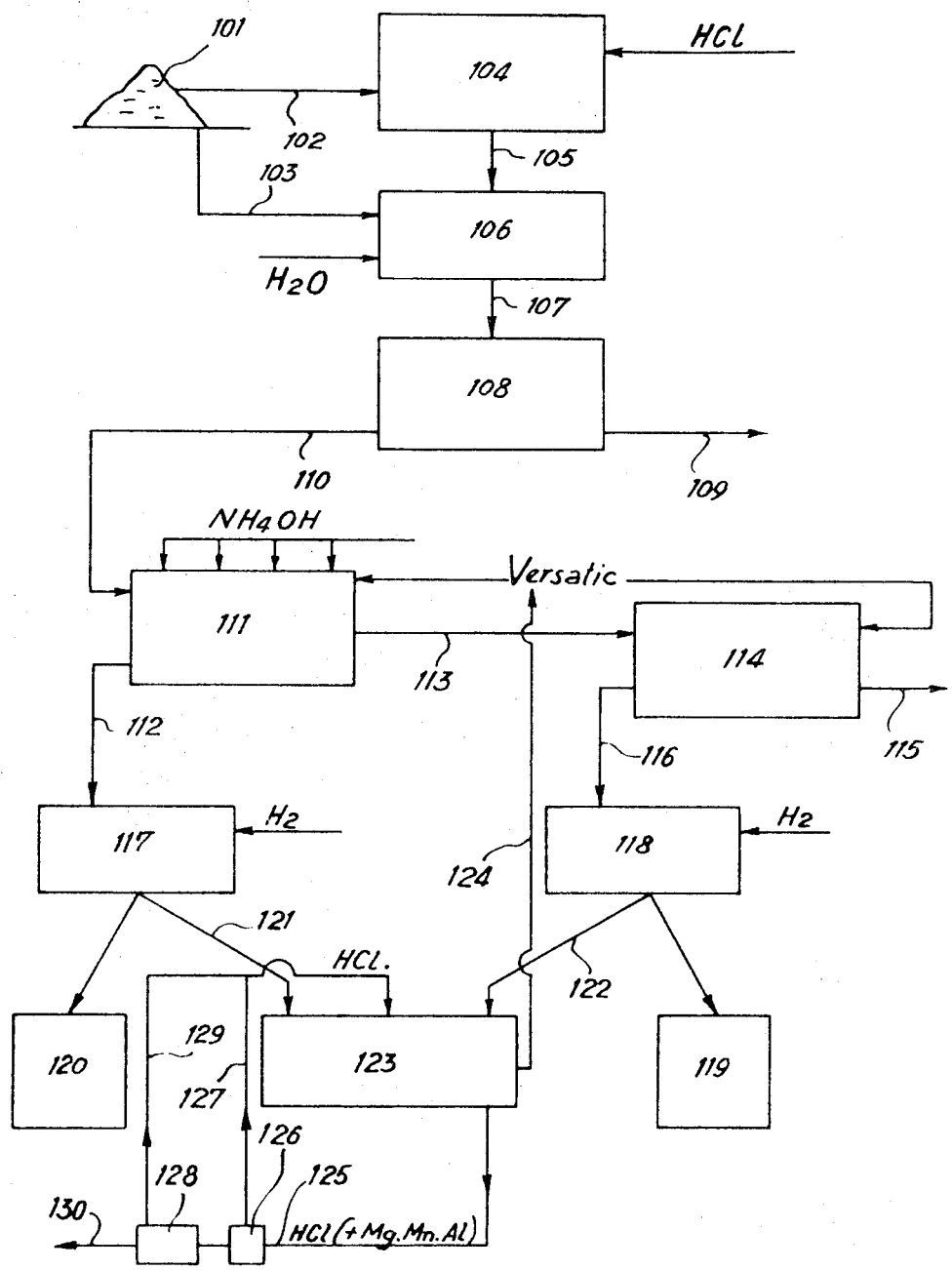

Embodiments of the present invention will now be described, by way of example with reference to the accompanying drawings, in which FIG. 1 is a flow diagram for one method of extraction according to the present invention, and FIG. 2 is a flow diagram for another method of extraction also according to the present invention.

There will firstly be described the method which makes use of a roasting treatment.

It is concerned with treating a laterite 1, for recovering the metallic valuables and in particular nickel and cobalt.

In a first stage of the method, a small amount 2 of the laterite is separated from the remains of the laterite 3, This fraction 2 is subjected at 4 to the action of a concentrated hydrochloric acid solution. The quantity of acid used is calculated in relation to the amount of metals present in the laterite in the form of oxides so as to transform them into chlorides. This operation is carried out, preferably, in the presence of air, until boiling. There is thus obtained a suspension 5 constituted, on the one hand, by a solution of chlorides of the various metals present in the initial laterite and chiefly ferric chloride, since iron is the predominant element in the mineral in the form of a trivalent iron oxide and on the other hand, by an insoluble residue chiefly constituted by silica and chromite.

The suspension 5 is used as a reagent for the treatment of the major part of the laterite. The suspension 5 and the fraction 3 are well mixed at 6, in particular by malaxage. The two constituents 3 and 5 are mixed in proportions calculated on the basis of the number of chloride ions theoretically necessary for the transformation of nickel oxide into nickel chloride. Thus, the laterite is treated by a quantity of the chloride suspension such that there is between 3 and 20 times and preferably between 5 and 15 times the quantity of chloride ions theoretically necessary for this transformation. The consistency of the mixture 7 obtained may vary from that of a damp powder to that of a fluid paste.

The mixture 7 is then subjected at 8 to an operation of chloridizing roasting in the course of which hydrogen chloride gas and water vapor are liberated at 9, the hydrochloric acid being concentrated at 10 and recycled as shown at 11 for the hydrogen chloride dissolving operation 4.

Due to this fact, the proportions of the mixture 6 are chosen in dependence on the following considerations:

with a relatively high proportion of the suspension 5 in the mixture 7, the nickel oxide is transformed into chloride with a yield of the order of 98 percent but there must be recycled at 11 a greater quantity of hydrogen chloride gas than when using average amounts such, for example, as 10 times the theoretical quantity of chloride ions which, nevertheless, make it possible to attain a transformation yield of the nickel of about 92 percent. For this same average proportion, more than 90 percent of the cobalt is transformed into soluble cobalt salt 5 to 15 percent aluminum, 30 to 60 percent manganese, 10 to 40 percent magnesium are also converted, while the remainder of the iron remains as an insoluble oxide. These percentages are calculated relative to the total of metals used for the two stages, namely the hydrogen chloride dissolving operation and the chloridizing roasting.

The chloridizing roasting carried out at 8 may be broken down into two successive stages. During the first stage 8a, the mixture 7, introduced into an oven, undergoes a rise in temperature in the course of which it is dried, which liberates water. The hydrochloric acid coming chiefly from the hydrolysis of ferric chloride is partially liberated at 9 with the water vapor, while, moreover, beginning to react with nickel and cobalt oxides (more generally with the oxides of metals other than iron), this reaction becoming more and more vigorous as the temperature increases. During the second stage 8b, the reaction mixture is kept at the maximum temperature during a sufficient length of time for the complete transformation into chlorides of the nickel and cobalt oxides and sufficient for the complete elimination of the excess hydrochloric acid.

The aforesaid maximum temperature should be between 250° and 350° C. and preferably between 275° and 325° C. The period during which it is kept at the maximum temperature depends mainly on this temperature and on the physical conditions of the gas/solid contact during roasting. Generally this period is from one to a few hours.

The drying and roasting operation preferably takes place with a current of air, which in no way hinders the transformation of the oxides into chlorides.

For the drying and roasting, there may be used a muffle furnace or a tunnel furnace heated with hot air; when the mixture 7 has the consistency of a damp powder, there may be used a rotary furnace or a hearth furnace of the HERRESCHOFF type.

Advantageously, if it is desired to reduce the moisture content of the mixture 7, one can, as shown at 12 recycle at 6 a small part of the mixture dried at 8a.

After roasting, the solid or calcined residue 13, finally obtained, contains only soluble chlorides of nickel, cobalt, manganese, aluminum and magnesium, exclusive of any insoluble oxy-chloride which might have formed.

The calcined product leaving the furnace 13, is then subjected at 14 to an extraction with water to dissolve the soluble chlorides. This operation is, preferably, carried out according to a well-known method in several counter-current stages by thickening and decantation. The solution containing the soluble metal chlorides is separated from the insoluble residue at 15 by filtration and decantation or a combination of these two operations.

The insoluble residue at 16 contains all the iron used and the greatest part of the magnesium, the aluminum and the manganese may be treated in order to recover the iron.

The primary solution 17 resulting from the lixiviation generally contains between 5 and 10 g./l. of nickel and cobalt. It is subjected to a concentration treatment of the metal salts on a bed 18 of a cation exchange resin of the sulphonated polystyrene type such as AMBERLITE 1R 120 of ROHM and HAAS operating in a hydrogen cycle or a sodium cycle. The solution is percolated on this resin until the latter is saturated with nickel then the metallic valuables retained are eluted, that is to say desorbed from the resin by percolation of a 20 percent by weight hydrochloric acid solution or a 20 percent by weight sodium chloride solution so that the resin works in a hydrogen or sodium cycle, solutions 19 are thus recovered from 3 to 7 times more concentrated in nickel and cobalt chlorides. In order to facilitate an understanding the bed has been shown once at 18 in the percolation stage and once again at 18a in the elution phase.

The solution 19 may then be subjected to a second more effective concentration in an evaporator-concentrator. The new solution obtained is then treated on an anion exchange resin of very basic type according to the method described in French Pat. No. 1,583,920, granted Oct. 27, 1969 in the name of the Applicant for "Method for the purification of nickel solutions." In this way, the cobalt solely retained on the resin is separated.

The nickel chloride solution in the presence of sodium chloride or hydrochloric acid contains as impurities only the chlorides of manganese, aluminum and magnesium. The solution containing sodium chloride may be subjected to an electrolysis with an insoluble anode which makes it possible to recover at the cathode, pure nickel, whereas from the solution containing hydrochloric acid there can be precipitated selectively the nickel by cementation to the aluminum according to the technique already described in French Pat. No. 6,927,703 granted Apr. 26, 1971, to the Applicant, for "Method for the preparation of nickel powders"; this latter treatment may, naturally, also be used on the solution containing sodium chloride.

As shown at 20, the spent waters coming from the concentration on the resin may be recycled at 14 in order to serve for the lixiviation of the calcined product.

The present invention will be further described in the following examples, in which, systematically, the term "part" should be understood as "part by weight."

EXAMPLE I

In this example, there was treated a laterite coming from the MONEO mine in New Caledonia, 1,000 parts of this laterite containing:

| | |
|---|---|
| Free water | 200 parts |
| Water of crystallization | 120 parts |
| Nickel | 9.2 parts |
| Cobalt | 1.2 parts |
| Iron | 400 parts |
| Aluminum | 16 parts |
| Manganese | 8.5 parts |
| Magnesium | 4 parts |

This mineral is very fine and requires no previous crushing.

Firstly, 63 parts of this laterite are treated with 161 parts of concentrated hydrochloric acid by boiling under reflux. There is thus obtained a suspension containing, in a soluble form, almost all the metallic elements. This suspension contains 55.3 parts of chloride ions mainly in the form of ferric chloride, 1,000 parts of laterite are mixed with the former suspension.

This thick paste obtained is spread on the base of a rectangular furnace which is sufficiently air-tight to enable recovery of the gases liberated in the course of the reaction. A current of air is passed through the vessel during the reaction.

The hydrogen chloride gases which are liberated are recovered by absorption in a packed column. The temperature is raised in about 1 hour to 300° C. and kept at this temperature for 1 hour. Then the calcined product is subjected to a lixiviation in water at 60° C. for 1 hour. Thus the metallic valuables are recovered in the form of soluble chlorides, the following table gives the quantities recovered and the percentages of metal passed into solution, calculated relative to the quantity used, i.e., the solubility yields.

| | Quantity passed into solution (parts) | Extraction yield (%) |
|---|---|---|
| Nickel | 7.32 | 75 |
| Cobalt | 1.03 | 81 |
| Iron | 0.00 | 0 |
| Aluminum | 1.87 | 11 |
| Manganese | 3.80 | 42 |
| Magnesium | 1.55 | 37 |

The solution obtained has a pH value of 3 and contains 28 parts of chloride ions, whereas 27 parts of chloride ions have been recovered in the form of hydrochloric acid which may be recycled to the first stage.

EXAMPLE II

This example relates to the treatment of a laterite coming from the PORO mine in New Caledonia, 1,000 parts of this laterite contain:

| | |
|---|---|
| Free water | 200 parts |
| Water of crystallization | 100 parts |

| | |
|---|---:|
| Nickel | 11.4 parts |
| Cobalt | 1.04 parts |
| Iron | 400 parts |
| Aluminum | 16 parts |
| Manganese | 8 parts |
| Magnesium | 3.6 parts |

This mineral has a porous structure, and for the method described below does not require any previous crushing. Firstly, in the same manner as Example 1, 140 parts, of this laterite are treated with 360 parts of concentrated hydrochloric acid. There is thus obtained a suspension containing 120 parts of chloride ions in solution mainly in the form of ferric chloride. This suspension is mixed with 1,000 parts of raw laterite. The paste obtained is placed in a layer in a furnace. The temperature is increased in one hour up to 300° C. and kept at this temperature for 2 hours. The calcined product obtained is subjected to a treatment with water in order to extract from it the soluble chlorides. The following table gives the quantities of metals passed into solution as well as the extraction yields of these metals calculated relative to the quantities used:

| (parts) | Quantities passed into solution | Extraction yield (%) |
|---|---|---|
| Nickel | 12.0 | 92 |
| Cobalt | 1.15 | 97 |
| Iron | 0.00 | 0 |
| Aluminum | 1.08 | 6 |
| Manganese | 4.55 | 50 |
| Magnesium | 0.64 | 13 |

The solution obtained has a pH of 2.1 and contains 30 parts of chloride ions whereas 90 parts are recovered in the form of hydrochloric acid which are recycled to the start of the process.

This solution titrating:
| | |
|---|---|
| Ni | 4.83 g/l |
| Co | 0.46 g/l |
| Fe | <0.005 g/l |
| Al | 0.44 g/l |
| Mn | 1.84 g/l |
| Mg | 0.26 g/l | was treated on a cation exchange resin of sulphonated polystyrene structure, AMBERLITE 1R 120 of ROHM and HAAS working in a sodium cycle. The metallic valuables retained are eluted by a solution of sodium chloride 20 percent by weight, and at equilibrium of this treatment on resin there is recovered a solution containing on average

| | |
|---|---|
| Ni | 23 g/l |
| Co | 2.20 g/l | and the metallic impurities Al, Mn, Mg.

This solution may be concentrated once again by passing it through an evaporator/concentrator to the saturation limit at about 80° C. The new concentrated solution obtained at this temperature is then percolated on a very basic anionic resin, AMBERLITE 1RA 400 working in a chloride cycle. Only the cobalt chloride is retained and may be eluted by a solution of sodium chloride at about 15 percent by weight. The solution of nickel chloride is, moreover, subjected to electrolysis at an insoluble anode and pure nickel is thus obtained at the cathode.

EXAMPLE III

A MONEO laterite, identical to that described in Example I was treated in the same way as in this example, but using double the quantity of chlorinating reagent, i.e., 110 parts of chloride ions in the form of a suspension, coming from the hydrogen chloride dissolving operation, for 1,000 parts of laterite. There is thus obtained a solution whereof the metallic valuable contents are shown in the following table along with the extraction yields.

| | Concentration in g./l. | Extraction yield, percent |
|---|---|---|
| Nickel | 5.20 | 95 |
| Cobalt | 0.70 | 99 |
| Iron | <0.005 | 0 |
| Aluminium | 1.60 | 17 |
| Maganese | 2.80 | 55 |
| Magnesium | 0.95 | 40 |

This solution is concentrated on AMBERLITE 1R 120 resin as in Example 2, and after this treatment there is obtained a solution containing:

| | |
|---|---|
| Ni | 23.3 g/l |
| Co | 3.9 g/l | and the metallic impurities Mn, Al, Mg.

This new solution may be concentrated by evaporation to saturation limit at about 80° C. As in Example 2, the cobalt may then be separated by passing it over a very basic anionic resin. The final stage of preparing the nickel may consist of a selective precipitation of this metal by aluminum powder according to the aforesaid French Pat. No. 6,927,703.

There will now be described the method of application of FIG. 2 which makes use of a thermal treatment with an autoclave.

As can be seen in FIG. 2, the laterite 101 to be treated is divided into a minor portion 102, and a major portion 103. The portion 102 is used to form the ferric chloride intended for the lixiviation of the portion 103. For this purpose, the portion 102 is sent directly, without drying or crushing, to a dissolver vessel 104, where it is treated with a concentrated solution of hydrochloric acid. The amount of hydrochloric acid used is selected so as just to transform the iron of the portion 102 from the oxide state into the ferric chloride state, although an excess of hydrochloric acid may be used. The treatment is preferably effected at boiling point and in the presence of air. During the dissolving operation, other metallic chlorides than ferric chloride are naturally formed, but the latter is the essential compound. The suspension 105 finally obtained is in the form of a mixture of the solution of chlorides and an insoluble residue. It is mixed at 106 with the major portion 103 of the laterite, this portion 103 being preferably previously dried and crushed to a particular dimension less than 1 mm. The proportion of the suspension 105 to be used relative to the laterite is calculated on the basis of the theoretical reaction:

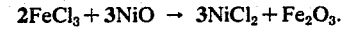
$2FeCl_3 + 3NiO \rightarrow 3NiCl_2 + Fe_2O_3$.

In practice, there is used between 2 and 5 times, and preferably between 2 and 3 times, the quantity of ferric/chloride theoretically necessary according to the above reaction in order to transform nickel oxide into chloride.

Preferably, the mixture treated at 106 is diluted with water such that it is in the form of a sufficiently liquid pulp in order to be able to be subjected to a stirring ensuring the renewal of the solid/liquid interface.

During the treatment at 106, the pulp is brought in an autoclave to a temperature comprised between 230° and 270° C., and preferably between 250° and 270° C., the highest temperatures ensuring a better solubility yield of the nickel and cobalt during the reactions of the aforesaid type.

The duration of the reaction at the fixed temperature may be between 30 minutes and 5 hours, this duration being able to be all the shorter the higher the fixed temperature and also the higher the proportion of ferric chloride used. Thus, the optimum conditions are 2 hours of reaction at 265° C. with 2.5 times the theoretical amount of FeCl₃, this leading to a solubility yield of nickel and cobalt very close to 100 percent and to the practically complete absence of iron in the solution.

After the completion of this reaction, the pulp 107 leaving the autoclave is re-treated with water and subjected at 108 to a series of decantation operations, counter-current washing and filtration (or centrifuging) which facilitates the separation of an insoluble residue 109, which contains all the iron and which is eliminated and of a low concentration aqueous solution 110, which generally contains the nickel (between 5 and 10 g./l), the cobalt, the manganese, the magnesium and the aluminum, the latter three metals being considered as impurities.

There will now be described the treatment of the solution 110.

The solution 110 is treated by a liquid/liquid extraction method in two stages. In the first stage, the solution 110 is brought into contact at 111 with a liquid cationic exchanger such as a long chain, aliphatic carboxylic acid, and in particular VERSATIC, dissolved in an organic solvent of the linear chain, aliphatic hydrocarbon type (kerosene) or cyclic type (cyclohexane), VERSATIC 911 (trade name) is a mixture of synthetic acids of the aforesaid type. In the following description, as an acid to simplification the expression VERSATIC acid will be used. In the course of this first stage of contact, ammonia solution is introduced at 111 which has the function of bringing the pH to a level for which most of the metals pass into the organic phase in the form of VERSATIC acid salts, except nickel which, existing in the state of a divalent amine complex, remains for the most part, in the aqueous phase.

There occurs at this stage, a nickel/cobalt separation, the latter oxidizing easily in an ammoniacal medium to form a trivalent amine complex for which the versatic acid has a much greater affinity.

There is thus separated an organic phase 112 containing the majority of the cobalt, accompanied by manganese, aluminum and magnesium and an aqueous phase 113 containing the majority of the nickel along with magnesium. The phase 113 is subjected at 114 to a fresh liquid/liquid extraction treatment using VERSATIC acid, such that the mother liquors 115 are finally separated from an organic phase 116 which contains the nickel.

In all these liquid extraction treatments, there are preferably used MIXER-SETTLER installations operating counter-currently and with a high number of stages. Preferably, volumetric ratios organic phase/aqueous phase of between 1:1 and 1:20, and preferably between 1:3 and 1:10 are used.

The organic phases 112 and 116 are finally subjected at 117 and 118 respectively, to a selective reduction by hydrogen under pressure and in an autoclave, according to a known technique.

There are thus selectively precipitated at 119 nickel powder and at 120 cobalt powder, the other metals not precipitating.

The residual organic phases 121 and 122 are sent to 123 to be regenerated with hydrochloric acid, concentrated and finally recycled at 124. The hydrochloric acid solutions 125 containing magnesium, manganese and aluminum are preferably treated by distillation at 126, the hydrochloric acid liberated being recycled at 127, then by roasting the chlorides at 128, the hydrochloric acid liberated being recycled at 129. At 130 the oxides of magnesium, manganese and aluminum are obtained.

Thus, in the course of the latter operations which have been described, there has been effected in an original manner, the separation of nickel and cobalt, then, on the other hand, the recovery of these two metals in the form of powder.

It will be noted that it is also possible, from the aqueous solution 110 to pass all the metals into the organic phase then to recover them separately by a selective reduction with hydrogen.

The following examples will make it easier to under stand how the invention may be applied practically in its second embodiment.

EXAMPLE IV

Influence of the Proportion of Reagent Used
A Moneo laterite with the following weight analysis:

|  | Free-water | Water of crystallization | Ni | Co | Fe | Mn | Al | Mg | Cr | Ca | SiO$_2$ |
|---|---|---|---|---|---|---|---|---|---|---|---|
| Percent | 20 | 12 | 0.92 | 0.12 | 40 | 0.85 | 1.62 | 0.40 | 1.64 | 0.14 | 6.1 | is subjected to the action of a concentrated hydrochloric acid solution and boiled under reflux. The quantity of hydrochloric acid is calculated relative to the quantity of iron contained in the laterite so as to transform it into ferric chloride. There is thus obtained a suspension containing chlorides in solution and in particular those of iron and nickel at the concentrations expressed in grams of metal per liter of solution.

$Fe = 48.7$ g/l (in the form of FeCl$_3$ mainly)
$Ni = 1.19$ g/l (in the form of NiCl$_2$)

There is then taken 1 part of the same laterite and after partial drying just sufficient to allow crushing so that all the particles pass through a mesh of 0.4 mm., it is impregnated with 2.5 parts of the suspension constituted by the former suspension and a certain quantity of dilution water such that there is contact with the laterite:

For test 1: 1.5 times the theoretical quantity of FeCl$_3$ calculated according to the reaction:

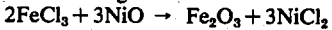
$2FeCl_3 + 3NiO \rightarrow Fe_2O_3 + 3NiCl_2$

For test 2: twice this theoretical quantity of FeCl$_3$.
for test 3: 2.5 times this theoretical quantity of FeCl$_3$.

For each of the 3 tests, the mixture is introduced into a glass-lined autoclave, and provided with a stirring device; the temperature is brought to 265° C. and kept at this level for 4 hours. After cooling, the paste obtained is subjected to an extraction by water and after filtration and washing of the insoluble residue and analysis of the solution and of this residue, the results given in the following table were recorded:

| Test No. | No. of times the theoretical quantity of FeCl$_3$ | Extraction yield of nickel, percent |
|---|---|---|
| 1 | 1.15 | 60 |
| 2 | 2 | 95 |
| 3 | 2.5 | 100 |

The extraction yield of nickel is calculated relative to the total amount of nickel used. The nickel content in the solution obtained is of the order of 2 g/l. It thus appears that the optimum proportion of FeCl$_3$ to be used is between 2 and 2.5 times the theoretical quantity for the basic conditions selected.

EXAMPLE V.

Influence of Temperature.
This example evaluates the influence of the temperature to which the pressure is linked.

One proceeds in the same manner as Example IV with 2.5 times the theoretical quantity of FeCl$_3$. The results obtained are given in the following table:

| Test No. | Period of time kept at⟶ | Temperature ° C. | Extraction yield of nickel, percent |
|---|---|---|---|
| 4 | 3 hours 30 minutes | 230 | 45 |
| 5 | 2 hours | 265 | 100 |

It appears that the higher temperature favor the solubility of the nickel.

EXAMPLE VI

Influence of the period of time kept at the maximum temperature.

Always using the same type of laterite and the same preparation of ferric chloride, two comparative tests were carried out with the following constants:

2.5 times the theoretical quantity of FeCl₃
Temperature 265° C.
The following results were obtained.

| Test No. | Time kept at 265° C. | Extraction yield of nickel, percent |
|---|---|---|
| 5 | 2 hours | 100 |
| 6 | 1 hour | 85 |

Thus, longer periods of keeping it at this temperature favor the extraction of nickel.

EXAMPLE VII

Influence of the nature of the laterite and of its sieve analysis.

| | Free water | Water of crystallization | Ni | Co | Fe | Al | Mn | Mg |
|---|---|---|---|---|---|---|---|---|
| Percent | 12.4 | 13.1 | 1.24 | 0.11 | 43.8 | 1.75 | 0.88 | 0.39 |

There was studied comparatively to the behavior of the MONEO laterite the PORO laterite. The latter, after a partial drying, corresponded to the above analysis, and wash crushed to different degrees of fineness: less than 1 mm. and then than 0.4 mm., whereas the MONEO laterite, as in the preceding tests, was crushed to "less than 0.4 mm."

The comparative tests were carried out with the following basic conditions:
Temperature 265° C.
Period of time kept at this temperature : 2 hours.
The main results obtained are grouped in the following table:

| Test No. | Laterite | No. of times the theoretical quantity of FeCl³ | Extraction yield of nickel, percent |
|---|---|---|---|
| 5 | Moneo, 0.4 mm | 2.5 | 100 |
| 7 | Poro, 0.4 mm | 2 | 95 |
| 8 | do | 2.4 | 100 |
| 9 | Poro, 1 mm | 2.3 | 80 |
| 10 | do | 2.8 | 97 |

It can thus be stated that with the same degree of fineness the type of laterite has little effect on the extraction yield. For a laterite which is much coarser, it is necessary to use a greater proportion of FeCl₃. However, the effectiveness of the agitation during the reaction plays an important part as regards the choice of the proportion of reagent to be used.

EXAMPLE VIII

After having determined the optimum operating conditions for the lixiviation, the complete treatment as described below is carried out:
40 parts of PORO laterite of the analysis

| | Free water | Water of crystallization | Ni | Co | Fe | Mn | Al | Mg |
|---|---|---|---|---|---|---|---|---|
| Percent | 12.4 | 13.1 | 1.24 | 0.11 | 43.8 | 0.88 | 1.75 | 0.39 | crushed in order to pass through a sieve of 0.4 mm., are subjected to the action of 38 parts of concentrated hydrochloric acid, and are boiled under reflux. The suspension obtained is mixed with 1,000 parts of this same crushed laterite and 2,500 parts of water; all this is placed inside an autoclave with a glass lining and which is provided with a mechanical stirring system.

The temperature is brought to 265° C. and kept at this level for 2 hours. Then after cooling, the pulp is retreated with water at about 80° C., according to a thickening/decantation process followed by a filtration. There is finally obtained a solution containing the metallic cations indicated in the following table with the quantities and the extraction yields of each of them calculated relative to the quantities used.

| Metal | Ni | Co | Mn | Mg | Al |
|---|---|---|---|---|---|
| Quantity in solution, parts | 12.9 | 1)15 | 5.04 | 2.09 | 1.22 |
| Extraction yield, percent | 100 | 100 | 55 | 51.6 | 6.7 |

The solution obtained contains:

| Ni | 6.30 g/l | Mn | 2.46 g/l |
| Co | 0.56 g/l | Al | 0.60 g/l |
| Fe | 0.001 g/l | Mg | 1.02 g/l | and has a pH of 2.1

This solution is subjected to an extraction process with VERSATIC 911 in a molar solution in cyclohexane. In a first extraction stage, there are added 5 volumes of the solution to 1 volume of the organic VERSATIC 911 solution and 0.4 volumes of ammonia solution at 16 percent by weight. After 10 minutes stirring, there is decanted and separated an organic phase (A) from an aqueous phase which is in turn subjected to an extraction by a fresh VERSATIC solution in the ratio 2.5 volumes of organic solution for 1 volume of the aqueous phase. In the same manner, there is separated after stirring and decantation an organic phase (B) from an aqueous phase (C) which only contains a very low proportion of nickel and cobalt used as appears in the following table giving the distribution of the said metallic elements between the three phases:

| | Organic phase (A) | | Organic phase (B) | | Aqueous phase (C) | |
|---|---|---|---|---|---|---|
| | Parts | Percent | Parts | Percent | Parts | Percent |
| Ni | 2.45 | 19 | 10.32 | 80 | 0.13 | 1 |
| Co | 1.13 | 98 | <0.01 | <0.2 | 0.02 | 1.8 |
| Mn | 4.79 | 95 | 0.05 | 1 | 0.20 | 4 |
| Mg | 0.67 | 32 | 1.36 | 65 | 0.06 | 3 |
| Al | 1.22 | 100 | <0.01 | <1 | <0.01 | <1 |

The percent represent the weight distribution of the elements contained in the initial solution between the three phases (A), (B) and (C). The organic phases (A) and (B) may then be subjected to a selective reduction by hydrogen under pressure. Thus from the phase (A), in a first stage, there precipitates only the nickel and in a second stage the cobalt, whereas phase (B) precipitates in the first stage only the nickel. The organic phases, separated from the powders after filtration of the last metallic precipitates, may be regenerated by hydrochloric acid which extracts the impurities Mn, Mg and Al which have not been precipitated by the treatment with hydrogen. After this regeneration, the organic phases may be recycled, whereas from the hydrochloric solutions there may be recovered hydrochloric acid by distillation and roasting of the chlorides of magnesium, aluminum and manganese obtained by crystallization.

What is claimed is:

1. A method for the recovery of metallic values contained in a laterite, and in particular nickel and cobalt, with elimination of the iron, said method comprising the steps of dividing the laterite into a minor fraction and a major fraction, treating the minor fraction with hydrochloric acid in order to create a suspension in which the iron of the laterite is transformed into ferric chloride, mixing the major fraction of the laterite with this suspension to form a homogeneous slurry, subjecting this slurry to a high temperature treatment in the course of which nickel and cobalt chlorides are formed, with liberation of hydrogen chloride, treating the solid residue with water to cause the nickel and cobalt chlorides to pass into a primary solution while the iron remains in the residue, and subjecting the said primary solution to a recovery treatment to recover the metallic values which it contains.

2. A method according to claim 1, wherein the said high temperature treatment comprises drying followed by roasting at a temperature between 250° and 350° C., the duration of the said roasting being in the order of one to a few hours, wherein the hydrogen chloride is recycled so as to participate in the treatment of the minor fraction of the laterite, and wherein the concentration of chloride ions in the said suspension is comprised between 3 and 20 times the stoichiometric concentration necessary for transforming the nickel oxide initially contained in the major fraction of the laterite, into nickel chloride.

3. A method according to claim 2, wherein a fraction of the mixture is recycled after drying and before roasting, in order to be mixed with the slurry with a view to adjusting its water content.

4. A method according to claim 1, wherein the said high temperature treatment is a treatment in an autoclave with a temperature autoclave with a temperature between 230° and 270° C., during a period of time between 30 minutes and 5 hours and wherein the concentration of chloride ions of the said suspension is between 2 and 5 times the stoichiometric concentration necessary for transforming the nickel oxide initially contained in the major portion of the laterite, into nickel chloride.

5. A method according to claim 1 wherein the said primary solution is passed over a bed of cationic exchange resin on which the nickel and the cobalt are retained, the effluent of the cationic exchange being recycled in order to participate in the re-treatment with water of the residue after roasting and the resin is regenerated in order to obtain a concentrated solution containing the nickel and the cobalt from which these metals are recovered.

6. A method according to claim 5, wherein the said resin, with a sulphonated polystyrene structure, is placed in a hydrogen cycle and wherein the resin is regenerated with desorption of the nickel and cobalt, with the aid of a hydrochloric acid solution.

7. A method according to claim 5, wherein the said resin, with a sulphonated polystyrene structure, is placed in a sodium cycle and the resin is regenerated, with desorption of the nickel and the cobalt, with the aid of a sodium chloride solution.

8. A method according to claim 1 wherein the said primary solution is contacted with an organic cationic exchange comprising at least one tertiary carboxylic acid having from nine to 11 atoms of carbon per molecule, ammonia solution is introduced simultaneously into the solution in order to bring its pH to a value for which the cobalt passes into the organic phase in the form of carboxylic acid salts, whereas the nickel remains in the aqueous phase in the form of a divalent amine complex, the organic phase is separated from the aqueous phase and the two phases are treated separately in order to recover the cobalt and the nickel, respectively.

9. A method according to claim 8, wherein the organic phase containing the cobalt is subjected to a reduction by hydrogen under pressure and in an autoclave in order to precipitate the cobalt, whereas the aqueous phase containing the nickel is put in contact with an organic, cationic exchanger chosen from the group of tertiary carboxylic acids having from nine to 11 atoms of carbon per molecule, in particular with VERSATIC 911, in solution in an organic solvent of aliphatic or cyclic hydrocarbon type, the nickel thus passing into the organic phase and this organic phase is subjected to a reduction by hydrogen under pressure and in an autoclave in order to finally precipitate the nickel.

* * * * *